United States Patent [19]

Higuma et al.

[11] Patent Number: 4,785,313

[45] Date of Patent: Nov. 15, 1988

[54] RECORDING MEDIUM AND IMAGE FORMATION PROCESS USING THE SAME

[75] Inventors: Masahiko Higuma, Tokyo; Ryuichi Arai; Mamoru Sakaki, both of Sagamihara; Takashi Akiya, Yokohama, all of Japan

[73] Assignee: Canon Kabushiki Kaisha, Tokyo, Japan

[21] Appl. No.: 919,507

[22] Filed: Oct. 16, 1986

[30] Foreign Application Priority Data

| | | | |
|---|---|---|---|
| Dec. 16, 1985 | [JP] | Japan | 60-282218 |
| Dec. 16, 1985 | [JP] | Japan | 60-282219 |
| Dec. 18, 1985 | [JP] | Japan | 60-283041 |

[51] Int. Cl.[4] .................... G01D 15/34

[52] U.S. Cl. .................... 346/135.1; 346/1.1; 427/161

[58] Field of Search .................... 346/1.1, 135.1; 427/161, 214, 256; 428/304.4, 411.1, 537.5

[56] References Cited

U.S. PATENT DOCUMENTS

| | | | |
|---|---|---|---|
| 4,252,601 | 2/1981 | Ceintrey | 361/1.1 X |
| 4,550,053 | 10/1985 | Arai et al. | 346/135.1 X |
| 4,613,525 | 9/1986 | Miyamoto et al. | 346/135.1 X |

FOREIGN PATENT DOCUMENTS

| | | |
|---|---|---|
| 0049040 | 4/1982 | European Pat. Off. . |
| 136480 | 8/1983 | Japan . |
| 136481 | 8/1983 | Japan . |

*Primary Examiner*—A. D. Pellinen
*Assistant Examiner*—Derek S. Jennings
*Attorney, Agent, or Firm*—Fitzpatrick, Cella, Harper & Scinto

[57] ABSTRACT

A recording medium is provided which comprises an ink transporting layer and an ink retaining layer. There is also provided a process for forming images on a recording medium comprising a heat or pressure-fusible ink transporting layer and an ink retaining layer, which comprises applying recording droplets to the ink transporting layer of the recording medium, and thereafter fusing the ink transporting layer to a substrate.

38 Claims, No Drawings

RECORDING MEDIUM AND IMAGE FORMATION PROCESS USING THE SAME

BACKGROUND OF THE INVENTION

1. Field of the Invention

The present invention relates to a recording medium suitable for recording by use of ink, such as recording by felt pens, fountain pens, pen plotters, ink jet recording devices or the like, and particularly, to a recording medium excellent in the ink absorbency and the colorfulness, definition and gloss of recorded images, and to an image formation process for obtaining recorded images of high image quality.

2. Description of the Related Art

Conventionally, recording media used for recording by use of ink, for example, writing by fountain pens, felt pens, ball point pens, etc. or recording by pen plotters, ink jet recording devices, etc. include ordinary paper such as high quality paper, bond paper and writing paper, or coated paper such as art paper and cast coated paper.

However, along the recent progress in recording devices such as ink jet recording devices and pen plotters, desirable recording performances have not been achieved by the above conventional recording media.

Since a high speed recording and a multi-color recording are carried out in recording processes as mentioned above to levels that can not be compared with conventional processes, the ink absorbency, the coloring performance required when plural kinds of ink have been deposited on the same place, and colorfulness, etc. have not reached satisfactory levels in the conventional recording media.

To solve these probelems, there has been hitherto proposed a number of coated paper, typified by ink jet paper, having a porous ink absorbing layer on the surface of a substrate. For example, recently, Japanese Patent Laid-open Publication No. 214989/1985 discloses a sheet provided on a substrate with a porous resin ink absorbing layer. This ink absorbing layer is a porous layer having minute pores or fissures in the interior, whereby the ink absorption rate is said to be improved.

It is possible to improve the ink absorbency to a certain extent by providing such a porous ink absorbing layer, but because the absorbing layer is porous, a recording medium tends to have a light diffusion property to make it impossible to obtain sharp recorded images having high optical density and glossy images also.

There is also a disadvantage that the recorded image has inferior resistance or preservability such as water resistance and abrasion resistance, because recorded images are viewed from one side of an ink recording face and thus the recording medium is constructed such that a recording agent is retained on the surface of the absorbing layer as much as possible.

European patent application No. 0049049 proposes a liquid-absorbent media constituted of a liquid-absorbent layer and a liquid-permeable layer in combination to improve surface characteristics of a substrate for pen plotters. The media are mainly characterized by their transparency, but the media are not suitable for recording apparatuses or recording methods requiring especially rapid ink-drying property since the inherent liquid absorbency of the underlayer is retarded by the surface layer having a higher liquid absorbency, even though the media have surface characteristics improved in a certain degree.

As a means for solving such problems, there are known, for example, a recording medium disclosed in Japanese Patent Laid-open Publications No. 136480/1983 and No. 136481/1983. This recording medium comprises an ink receiving layer provided on a substrate, mainly composed of a pigment having the refractive index of 1.58 or less, and is of such a type that the recorded images are viewed from the side of the substrate. In this recording system, performances such as water resistance at the viewing side have been well satisfied. However, although the whiteness is increased by the employment of a large amount of pigment for enhancing the whiteness of the ink receiving layer, the ink deposited tends to be adsorbed by the pigment to lessen the amount of the ink reaching the interface between the ink receiving layer and the substrate, and thus there are disadvantages such that the image density can not be made sufficiently high at the viewing side and also the colorfulness, the definition, etc. are inferior.

Recently, as the recording practiced by use of ink jet recording devices, pen plotters, etc. becomes higher in fidelity, there are increasing demands for the recording media that may have greatly improved recording performances. In other words, it has become necessary to provide recording media markedly superior to the conventional media in all the traits of ink absorbency, the coloring performance of a recording agent, the image quality of recorded images, the definition, the colorfulness, the density of recorded images, the glossiness, the water resistance, the light-resistance, etc. At present, however, no recording media have been obtained that can satisfy all of these recording performances simultaneously.

SUMMARY OF THE INVENTION

An object of the present invention is to provide a recording medium having appropriate glossiness on its surface and capable of obtaining recorded images having excellent image density.

Another object of the present invention is to provide a recording medium capable of obtaining recorded images having excellent water resistance, abrasion resistance, preservability, visual appreciation, etc.

Still another object of the present invention is to provide an image formation process by which the high quality recorded images as mentioned above can be readily obtained.

Further object of the present invention is to provide an image formation process capable of readily forming images on the surfaces of ordinary paper, metal, glass, plastic or the like without any special treatment of the surface.

Other objects can be achieved by thepresent invention described below.

According to an aspect of the present invention, there is provided a recording medium comprising an ink transporting layer and an ink retaining layer.

According to another aspect of the present invention, there is provided a recording medium comprising a heat and/or pressure-fusible ink transporting layer and an ink retaining layer.

According to a further aspect of the present invention, there is provided a process for forming images on a recording medium comprising a heat-and/or pressure-fusible ink transporting layer and an ink retaining layer, which comprises applying recording droplets to said ink transporting layer of the recording medium, and thereafter fusing said ink transporting layer to a substrate.

According to a still further aspect of the present invention, there is provided a process for forming images on a recording medium comprising an ink transporting layer and an ink retaining layer, which comprises applying recording droplets to said ink transporting layer of the recording medium, wherein the image density (A) measured from the side of the ink retaining layer is larger than the image density (B) measured from the side of the ink transporting layer.

DETAILED DESCRIPTION OF THE PREFERRED EMBODIMENTS

The recording medium of the present invention, in which the recording is basically practiced by introducing ink into the ink transporting layer, is principally characterized by very high image density of images viewed from the ink retaining layer side (or the substrate side) as compared with the image density of images viewed from the ink transporting layer side.

More specifically, the ink transporting layer constituting a recording medium of the present invention is liquid-permeable, and has a function to immediately absorb and permeate a recording liquid attached on its surface, and on the other hand, the ink retaining layer has a function to absorb and retain the recording liquid or a recording agent migrating from said ink transporting layer.

In this case, the ink transporting layer must have high affinity to a liquid medium in the recording liquid, and at the same time must have low affinity, on the contrary, to the recording agent (i.e., a colorant such as dye and pigment, and a material having a coloring property). Accordingly, the ink transporting layer must be constituted by selecting the materials that have properties such as wettability, permeability and diffusibility with respect to the recording medium, and have not properties such as absorbency, permeability and reactivity with respect to the recording agent.

The ink transporting layer not having the properties of wettability, permeability and diffusibility and the like to the recording medium may result in no immediate permeation of a recording liquid into the interior of the ink transporting layer when the recording liquid is applied to the ink transporting layer, thereby lowering the recording liquid absorbency. Further, the recording liquid tends to remain in such an transporting layer without reaching rapidly the ink retaining layer to make it impossible to obtain recorded images having good water resistance.

The ink transporting layer having properties of absorbency, permeability and reactivity and the like to the recording agent may result in that a recording agent remains on the surface or in the inside of the ink transporting layer without reaching the ink retaining layer, to make it impossible to obtain sufficiently colorful recorded images having high optical density.

On the other hand, the ink retaining layer, which absorbs and captures a recording liquid temporarily absorbed in the ink transporting layer, must have stronger absorption capacity to the recording liquid than the ink transporting layer has. Therefore, the ink retaining layer must have high affinity not only to the recording liquid medium, but also to the recording agent.

The present invention will be described below in detail based on working examples.

The recording medium of the present invention is constituted of a substrate as a support, an ink retaining layer formed on said support to substantially absorb and capture a recording liquid or a recording agent, and an ink transporting layer formed on the ink retaining layer and having liquid-permeability to directly accept the recording liquid but not substantially allow it to remain.

The substrate may not necessarily required if the ink transporting layer or the ink retaining layer may function simultaneously as a substrate.

The substrate used in the present invention may include those conventionally known, for example, plastic films or plates made of polyethylene terephthalate, polycarbonate resins, polystyrene resins, polysulfone resins, polybutylene terephthalate resins, polypropylene resins, methacrylic resins, diallyl phthalate resins, unsaturated polyester resins, cellophane, acetate plastics, cellulose diacetate, cellulose triacetate, celluloid, vinyl chloride resins etc., or glass plates.

In the recording medium of the present invention when observed from the side opposite to the recording face, the substrate is required to be transparent.

In such an occasion, the substrate may be applied with any processing so long as it can finally retain the transparency. For instance, it is possible to apply on it desired patterns or gloss (appropriate gloss or silky pattern).

It is also possible to impart water resistance, abrasion resistance and blocking resistance to the image-viewing face of the recording medium by selecting materials having water resistance, abrasion resistance and blocking resistance as the substrate.

The substrate may have a thickness ranging between 1 and 5000 μm, preferably between 3 and 1000 μm, more preferably between 5 and 500 μm.

In order to improve adhesion between the ink retaining layer and the substrate, the substrate may be pretreated by corona treatment, alkali agent coating, etc.

The ink transporting layer constituting the recording medium of the present invention is required to have liquid-permeability and light diffusing property.

The liquid-permeability mentioned in the present invention refers to the property that may immediately permeate a recording liquid and may not substantially allow a recording agent in the recording liquid to remain in the ink transporting layer.

In the present invention, as a preferred embodiment for improving the liquid-permeability, the surface or the inside of the ink transporting layer may have porous structure containing fissures or communicated holes (including those of micro size). For example, in the recordnng with an aqueous ink, the following embodiments can be enumerated:

(1) an embodiment wherein the layer is constituted of non-dyeable particles and a binder, and has fissures internally;

(2) an embodiment wherein other materials are dispersed in a coating, and the inside of the layer is made porous by treating it with a solvent;

(3) an embodiment wherein a resin is dissolved in a mixed solvent so that a high boiling solvent may act as a poor solvent for the resin to make porous the inside of the layer; and (4) an embodiment wherein a foamable material is contained when coating so that the inside of the layer may be made porous.

Materials used here should be selected from those non-swelling to water and a solvent in ink, and not dyeable to a dye in ink.

A preferred embodiment of the ink transporting layer according to the present invention, satisfying the above properties is, for example, the embodiment wherein the layer is constituted of non-dyeable particles and a binding agent.

As the non-dyeable particles satisfying the above properties, there may be used at least one of organic resin particles made of thermoplastic resins or thermosetting resins including, for example, organic resin powder, an emulsion and a suspension of polyethylene resins, methacrylic resins, elastomers, polystyrene resins, ethylene-vinyl acetate copolymer, styrene-acrylic copolymer, fluoroplastics, polyamide resins, polypropylene resins, methacrylic resins, guanamine resins, melamine formaldehyde resins, urea formaldehyde resins, silicones, celluloses, benzoguanamine resins, SBR (styrene-butadiene rubber), polyesters, thermoplastic elastmers, etc.; particles of inorganic pigment treated so as to be made non-porous; or the like.

The binder used in the present invention has a function to bind the above particles each other and/or the ink retaining layer, and is required to be nondyeable to the recording agent as in the case of the above particles.

As preferable materials for the binder, there may be used any of known materials of those having the above function, for example, one or more resins of ionomer resins, acrylonitrile-styrene copolymer, ethylene-vinyl acetate copolymer, vinylidene chloride resins, polyvinyl acetate resins, styrene-acrylic copolymer, phenolic resins, isobutylene-moleic anhydride copolymer, epoxy resins, polyvinylidene chloride resins, xylene-formaldehyde resins, cumarone resins, ketone resins, polyvinyl alcohol, polyvinyl butyral resins, polyvinyl pyrrolidone, acrylic resins, starch, carboxymethyl cellulose, methyl cellulose, ethyl cellulose, styrene butadiene rubber, gelatin, casein, polyurethane resins, polychloroprene resins, melamine formaldehyde resins, nitrile rubber, urea formaldehyde resins, etc.

To the ink transporting layer, it is also allowable to add particles having higher refractive index, for example, pigment particles, in such amount that may not impair its ink permeability.

If necessary, various additives, for example, a surfactant, a penetrating agent, etc. may be added to the ink transporting layer in order to improve the above functions as an ink transporting layer.

The mixing ratio (by weight) of the non-dyeable particles and the binder in the ink transporting layer (particles/binder) may range between 1/3 and 70/1, preferably between 1/1 and 50/1, more preferably between 3/1 to 20/1. The mixing ratio of less than 1/3 may result in too small fissures and communicated holes in the ink transporting layer and decrease in the absorbability of the recording liquid. The mixing ratio of more than 70/1, on the other hand, may result in insufficient adhesion between the particles themselves or the ink retaining layer and the particles, whereby the ink transporting layer can not be formed.

The ink transporting layer may have a thickness, though depending on the amount of the recording liquid, of 1 to 300 μm, preferably 5 to 200 μm, more preferably 10 to 150 μm.

Referring to the porous ink retaining layer which substantially captures the recording liquid or the recording agent, it absorbs and capture the recording agent passed through the ink transporting layer to retain it substantially permanently. Therefore, it is required for the ink retaining layer to have stronger absorption capacity than the ink transporting layer.

This is because, if the absorption power of the ink retaining layer is less than that of the ink transporting layer, it follows that the recording liquid applied on the surface of the ink transporting layer remains retained in the ink transporting layer when a top portion of the recording liquid reached the ink retaining layer after passing through the ink transporting layer, whereupon the recording liquid permeates and diffuse at the interface between the ink transporting layer and the ink retaining layer in the lateral direction in the ink transporting layer. As a result, the definition of recorded images will be lowered to make it impossible to form images of high quality.

The ink retaining layer, as mentioned before, is required to be transparent when recorded images are viewed from the side opposite to the recording face.

The ink retaining layer satisfying the above requirements is preferably constituted of a light-transmissive resin capable of absorbing the recording agent and/or a light-transmissive resin having solubility and swelling property to the recording liquid.

For example, when an aqueous recording liquid containing as the recording agent an acidicddye or a direct dye, the ink retaining layer is constituted of a cation resin having absorbency to the dye and/or a hydrophilic polymer having swelling property to the aqueous recording liquid.

The above polymer may include, for example, the following:

(1) block copolymers or graft copolymers having hydrophilic segments and hydrophobic segments within the molecule:

Such block copolymers or graft copolymers are water-insoluble as a whole, but hydrophilic. The hydrophilic segments of such polymers are, for example, segments formed by polymerization of two or more vinyl monomers having hydrophilic groups such as a carboxyl group, a sulfonic acid group, a hydroxyl group, an ether group, an acid amide group, methylol groups of these, a primary to tertiary amino group and a quaternary ammonium group. Examples of such hydrophilic monomer may include acrylic or methacrylic acid, maleic anhydride, vinyl sulfonic acid, sulfonated styrene, vinyl acetate, monoacrylates or monomethacrylates or monomaleates of polyols such as ethylene glycol, acrylic or methacrylic amides or methylols of these, mono- or dialkylaminoethyl acrylate or methacrylate, quaternary compounds of these, vinyl pyrrolidone, vinyl pyrimidine, etc.

The hydrophobic polymer segments are polymers of two or more of monomers including olefins such as ethylene, propylene and butylene; aromatic vinyl compounds such as styrene, methylstyrene and vinyl naphthalene; halogenated olefins such as vinyl chloride, vinylidene chloride and vinylidene fluoride; various alcohol esters of unsaturated carboxylic acids such as acrylic or methacrylic acid and crotonic acid; etc.

It is also possible as a matter of course to use water-soluble polymers other than the above as the hydrophilic polymer segments or the hydrophobic polymer segments, including, for example, natural or synthetic hydrophilic polymers such as albumin, gelatine, casein, starch, cation starch; natural resins such as gum arabic and sodium alginate, polyvinyl alcohol, polyamide, polyacrylamide, polyvinyl pyrrolidone, polyethylene imine, polyvinyl pyridylium halide, melamine resin, polyurethane, polyester and sodium polyacrylate; or natural or synthetic hydrophobic polymers modified by making these polymers insoluble in water.

(2) Crosslinked water-soluble polymers:

These are obtained by crosslinking the water-soluble polymers mentioned above or those mentioned below with use of suitable crosslinking agents or radiations to the degree that may be made insoluble in water without losing the hydrophilic nature.

(3) Polymer complex:

Polymer complex is comprised of two or more of water-soluble or hydrophilic polymers which are different from each other and may act on each other. There is produced a mixture having different nature from either of the original polymers. For example, two or more of polymers are strongly bonded through electrostatic force between ions, hydrogen bonding, van der Waals force, partial migration of electrical charge, etc.

There may be used various ones as the polymer complex, but most preferable in the present invention is a polymer complex comprising a basic polymer and an acidic polymer.

The materials constituting the ink retaining layer may not be particularly limited if they have a function to absorb and capture the recording liquid and is capable of forming a non-porous layer.

The ink retaining layer may have a thickness sufficinet for absorbing and capturing the recording liquid, which may range, though variable depending on the amount of the recording liquid, between 1 and 70 μm, preferably between 2 and 50 μm, and more preferably between 3 and 30 μm.

The method of forming the ink retaining layer and the ink transporting layer on the substrate may preferably comprise preparing a coating liquid by dissolving or dispersing the material in a suitable solvent mentioned above, applying the coating liquid on the substrate by a conventionally known method such as roll coating, rod bar coating, spray coating and air knife coating, followed immediately by drying. Alternatively, there may be used the hot melt coating mentioned before or a method comprising once making a single sheet from the above-mentioned materials, and then laminating the sheet on the substrate.

When the ink retaining layer is provided on the substrate, however, strong adhesion is required between the substrate and the ink retaining layer so that no space or gap may be present therebetween. The presence of the space or gap between the substrate and the ink retaining layer may result in irregular reflection of recorded images at the surface to lower substantial optical density of images undesirably.

Means for forming images by using the recording medium of the present invention may include recording tools and recording devices using a recording liquid containing a recording agent, such as fountain pens, ball point pens, felt pens, pen plotters, ink mist, ink jet and a variety of printing.

Of these recording tools and recording devices, the ink jet recording device and the pen plotters are preferable from a viewpoint of the high speed image recording.

The recording liquid for making recording on the recording medium of the present invention may preferably include conventionally known aqueous and/or oily recording-liquids, and is required to have a viscosity of 1000 cps or less, preferably 100 cps or less, and more preferably 50 cps or less, in order to immediately permeate into the ink transporting layer and to be absorbed and captured in the ink retaining layer.

Considering the stability to fire or the environmental pollution, the water recording-liquid is preferred. As the recording agent contained in the recording liquid, there may be used any of conventionally known colorants such as dyes and pigments, and/or those having coloring property.

For example, the recording agent used for the ink jet recording may preferably include water-soluble dyes typified by direct dyes, acidic dyes, basic dyes, reactive dyes, food dyes, edible dyestuff, etc., and, as those capable of giving images achieving satisfactory fixing performance, coloring performance, sharpness, stability, light resistance and other required performances when used in combination with the recording medium, preferably include, for example, direct dyes such as C.I. Direct Black 17, 19, 32, 51, 71, 108 and 146; C.I. Direct Blue 6, 22, 25, 71, 86, 90, 106 and 199; C.I. Direct Red 1, 4, 17, 28 and 83; C.I. Direct Yellow 12, 24, 26, 86, 98 and 142; C.I. Direct Orange 34, 39, 44, 46 and 60; C.I. Direct Violet 47 and 48; C.I. Direct Brown 109 and C.I. Direct Green 59, and acid dyes such as C.I. Acid Black 2, 7, 24, 26, 31, 52, 63, 112 and 118; C.I. Acid Blue 9, 22, 40, 59, 93, 102, 104, 113, 117, 120, 167, 229 and 234; C.I. Acid Red 1, 6, 32, 37, 51, 52, 80, 85, 87, 92, 94, 115, 180, 256, 317 and 315; C.I. Acid Yellow 11, 17, 23, 25, 29, 42, 61 and 71; C.I. Acid Orange 7 and 19 and C.I. Acid Violet 49. Besides these, C.I. Basic Black 2; C.I. Basic Blue 1, 3, 5, 7, 9, 24, 25, 26, 28 and 29; C.I. Basic Red 1, 2, 9, 12, 13, 14 and 37; C.I. Basic Violet 7, 14 and 27; C.I. Food Black 1 and 2; etc. may be also used.

The above dyes are examples particularly preferable for the ink applicable to the recording process of the present invention, and dyes for the ink used in the present invention may not be limited to these.

These water-soluble dyes are generally used in conventional ink in an amount of such a proportion that may hold about 0.1 to 20% by weight, and may be used in the similar proportion also in the present invention.

The solvent preferably used in the ink used in the present invention includes water or a mixed solvent comprising water and a water-soluble organic solvent. Particularly preferable solvent is a mixed solvent comprising water and a water-soluble solvent, and the water-soluble organic solvent includes one containing a polyhydric alcohol having an effect to prevent ink from drying. As the water, preferably used is not ordinary water containing various ions, but deionized water. The water-soluble organic solvent used by mixing with water may include, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols containing alkylene groups having 2 to 6 carbon atoms, such as ethylene glycol, propylene glycol, butylene glycol, triethylene glycol, 1,2,6-hexanetriol, thiodiglycol, hexylene glycol and diethylene glycol; glycerin; lower alkyl ethers of polyhydric alcohols such as ehtylene glycol methyl (or ethyl) ether, diethylene glycol methyl (or ethyl) ether and triethylene glycol monomethyl (or monoethyl); N-methyl-2-pyrrolidone, 1,3-dimethyl-2-imidazolidinone, etc. Of these numerous water-soluble organic solvents, preferably used are polyhydric alcohols such as diethylene glycol and lower alkyl ethers of polyhydric alcohols such as triethylene glycol monomethyl (or monoethyl) ether.

The above water-soluble organic solvent may be contained in the ink in an amount ranging between 0 and 95% by weight, preferably between 10 and 80% by weight, and more preferably between 20 and 50% by weight.

Besides the foregoing components, if necessary, the ink used in the present invention may contain a surfactant, a viscosity modifier, a surface tension regulator, etc.

The image formation process of the present invention will be described below.

In the present invention, images are recorded by applying the recording liquid to the ink transporting layer of the recording medium.

After recording, it is possible to make transparent the ink transporting layer to view the images from the side at which the ink was applied, but, in order to make the most of the characteristic feature of the present invention, i.e., the higher density of the images viewed from the ink retaining layer side (or the substrate side) as compared with the density of the images viewed from the ink transporting layer side, it is preferable to apply recording droplets based on mirror images of the recording images to the ink transporting layer of the recording medium, and view the images from the ink retaining layer side.

In the present invention, the image density (A) measured from the substrate side (or the ink retaining layer side) reaches about 1.2 times or more of the image density (B) measured from the ink transporting layer side, and can be also very readily made 1.5 times or more or 2.0 times or more.

Another image formation process using the recording medium of the present invention comprises recording images by applying recording droplets to the ink transporting layer, adhering the transporting layer of the recording medium on which images have been recorded, to the substrate made of metal, plastic, cloth, paper, etc., followed by application of heat to, or contact bonding of, both of these, to form recorded images on the substrate by using ink.

In this instance, materials for the ink transporting layer must be selected so that the fusing temperature for the ink transporting layer may be in the range of 70° to 150° C. in practical use.

Although no images could not have been formed on metal or plastic by the conventional recording processes, the process of the present invention has made it possible to readily form images of high quality and high density by using ink, on such a substrate that could not have been recorded unless a special treatment is applied on its surface.

The recording medium of the present invention, constructed as mentioned above, has superior effects that could not have been achieved conventionally, when the recorded images are viewed from the side opposite to the recording face, i.e., the ink-retaining-layer side or the substrate side, although it is not impossible to view the recorded images from the side on which images are recorded by using a recording liquid as in ordinary paper. More specifically, the diffusible reflection is minimized on the image viewing side because of the light-transmissive ink retaining layer, thereby obtaining high optical density of images that cannot be achieved when images are recorded on a porous sheet such as paper by use of a recording liquid.

It is also possible to provide sharp recorded images because the absorbency of a recording liquid and the definition of recorded images have been improved by the liquid-permeability imparted to the ink transporting layer acting as a recording face and the fissures or communicated holes formed internally.

Further, when a transparent substrate is used as a support, in addition to the effects owing to the light-transmissive substrate, the recorded images are endowed with glossiness, water-resistance, weathering resistance and abrasion resistance.

Still further, since the colorant which forms images, a dye for example, is not retained on the surface of the recording medium but is mostly present in the ink retaining layer interposed between the substrate and the ink transporting layer, the images are less influenced externally. Accordingly, the migration of dyes due to moisture absorption or the color change or degradation thereof by light have been remarkably ameliorated.

The recording medium of the present invention is markedly superior in the optical density of recorded images and the operational facility during the image formation processing, as compared with the conventional method in which a transparent film is laminated on the surface of recorded images.

As described above, the present invention has good effects in the absorbency of recording liquid, the optical density of recorded images, the definition, the glossiness, the water resistance, the light resistance, the abrasion resistance and the operational facility during the image formation processing.

It has been also made possible according to the process of the present invention to readily form recorded images having the above respective performances on glass, plastic, cloth and the like.

The present invention will be specifically described below based on Examples. In Examples, the quantity "parts" is based on weight.

EXAMPLE 1

A polyethylene terephthalate film (100 μm thick; produced by Toray Industries, Inc.) used as a light-transmissive substrate was coated on its surface with the following Composition A by means of a bar coater so as to have a dried film thickness of 8 μm, followed by drying in a drying stove at 120° C. for 5 minutes.

| Composition A: | |
|---|---|
| Polyvinyl pyrrolidone (PVP K-90; produced by GAF; 10% DMF solution) | 88 parts |
| Novolac phenol resin (Resitop PSK-2320; produced by Gun-ei Chemical Industry Co., Ltd.; 10% DMF solution) | 12 parts |

Subsequently, the above coating was further coated with the following Composition B by means of a bar coater so as to have a dried film thickness of 30 μm, followed by drying in a drying stove at 80? C. for 10 minutes.

| Composition B: | |
|---|---|
| Low density polyethylene resin (Chemiparl M-200; | 100 parts |

-continued

| Composition B: | |
|---|---|
| produced by Mitsui Petrochemical Industries, Ltd; solid content; 40%; particle size: 5 μm) | |
| Ethylene/vinyl acetate copolymer resin (Chemipearl V-100; produced by Mitsui Petrochemical Industries, Ltd; solid content: 40%; particle size 5 μm) | 10 parts |
| Polyoxyethylene octyl phenyl ether(Emulgen 810; produced by Kao Corporation) | 0.2 part |

The recording medium thus obtained was white and opaque. On this recording medium, ink jet recording was carried out with use of four kinds of ink shown below and with use of a recording device (orifice size: 18×25 microns; driving voltage: 22.5V; frequency: 2 kHz) equipped with an on-demand type ink jet recording head, in which bubbles were generated by means of a heating resistor and a recording liquid was ejected under the pressure thereof. The makeup of the four kinds of the recording liquids employed are shown in Table 1. Recorded matters thus obtained were tested according to the following procedures to evaluate whether they can sufficiently answer the object of the present invention.

(1) Ink absorbency was evaluated by measuring the time for the recorded matters, having been left at room temperature after the ink jet recording, to be sufficiently dried and fixed without staining fingers with ink even when a recorded portion was touched.

(2) Optical density of images (O.D.) was measured from the side (B) on which ink was applied and its reverse side (A), on black ink recorded portions and by using Macbeth densitometer TR-524.

(3) Image surface gloss was evaluated by measuring 45° specular gloss of the surface of images to be viewed according to JIS Z8741.

(4) Operational facility was evaluated by designating as "o" where no cumbersome handling was required during the image formation processing, and as "X" where cumbersome handling was required (5) Water resistance of images was evaluated by measuring the image densities of solid black color printed images (from the ink retaining layer side) before and after having been immersed in flowing water for 5 minutes, with use of Macbeth densitometer TR-524, and is represented by percentage obtained by dividing the density after immersion by the density before immersion. The higher the value, the better is the water resistance.

Overall evaluations were made based on the results thus obtained. Results are shown in Table 2.

The overall evaluations were made by designating as "o" where the recording liquid was immediately absorbed, the suitability to ink jet recording was excellent, and the glossiness of image viewing surface, the sharpness of recorded images, the operational facility during image formation processing and the water resistance of images were good, and as "X" where any one of the ink jet suitability, the glossiness of image viewing surface, the operational facility during image formation processing and the water resistance of images was insufficient.

TABLE 1

| | |
|---|---|
| Yellow ink (makeup): | |
| C.I. Direct Yellow 86 | 2 parts |
| N—methyl-2-pyrrolidone | 10 parts |
| Diethylene glycol | 20 parts |
| Polyethylene glycol #200 | 15 parts |
| Water | 55 parts |
| Magenta ink (makeup): | |
| C.I. Acid Red 35 | 2 parts |
| N—methyl-2-pyrrolidone | 10 parts |
| Diethylene glycol | 20 parts |
| Polyethylene glycol #200 | 15 parts |
| Water | 55 parts |
| Cyan ink (makeup): | |
| C.I. Direct Blue 86 | 2 parts |
| N—methyl-2-pyrrolidone | 10 parts |
| Diethylene glycol | 20 parts |
| Polyethylene glycol #200 | 15 parts |
| Water | 55 parts |
| Black ink (makeup): | |
| C.I. Food Black 2 | 2 parts |
| N—methyl-2-pyrrolidone | 10 parts |
| Diethylene glycol | 20 parts |
| Polyethylene glycol #200 | 15 parts |
| Water | 55 parts |

EXAMPLE 2

A polyethylene terephthalate film used in Example 1 as a light-transmissive substrate was coated on its surface with the following Composition C by means of a bar coater so as to have a dried film thickness of 5 μm, followed by drying in a drying stove at 110° C. for 10 minutes.

| Composition C: | |
|---|---|
| Polyvinyl pyrrolidone (PVP K-90; produced by GAF; 10% DMF solution) | 84 parts |
| Styrene/acrylic acid copolymer (Oxylac SH-2100; produced by Nippon Shokubai Kagaku Kogyo Co., Ltd.; 10% DMF solution) | 16 parts |

Subsequently, the above coating was further coated with the following Composition D by means of a bar coater so as to have a dried film thickness of 40 μm, followed by drying in a drying stove at 120° C. for 10 minutes.

| Composition D: | |
|---|---|
| Polymethacrylate resin (Microsphere M-100; produced by Matsumoto Yushi-Seiyaku Co., Ltd.; mean particle size: 5 μm) | 100 parts |
| Ionomer resin (Chemipearl SA-100; produced by Mitsui Petrochemical Industries, Ltd; solid content: 35%) | 30 parts |
| Sodium dioctylsulfosuccinate (Pelex OT-P; produced by Kao Corporation; solid content: 70% | 0.15 part |
| Water | 40 parts |

The recording medium thus obtained was white and opaque. On this recording medium, ink jet recording was carried out in the same manner as in Example 1.

Evaluations of the recording medium were also made following the procedures in Example 1. Results are shown in Table 2.

EXAMPLE 3

A polyethylene terephthalate film used in Example 1 as a light-transmissive substrate was coated on its surface with the following Composition E by means of a bar coater so as to have a dried film thickness of 10 μm, followed by drying in a drying stove at 100° C. for 12 minutes.

| Composition E: | |
|---|---|
| Comb polymer* (25% Methyl Cellosolve solution) | 60 parts |
| Monoalkyl Esters of Poly(methyl vinyl ether/maleic acid) (Gantrez ES-425; produced by GAF; 10% solution in water/ethanol) | 40 parts |

*A graft polymer of 80 parts of backbone chain (copolymer of 64 parts of 2-hydroxyethyl methacrylate and 16 parts of dimethyl acrylamide grafted with 20 parts of MMA macromer)

Subsequently, the above coating was further coated with the following Composition F by means of a bar coater so as to have a dried film thickness of 30 μm, followed by drying in a drying stove at 70° C. for 10 minutes.

| Composition F: | |
|---|---|
| Thermoplastic elastomer resin (Chemipearl A-100; produced by Mitsui Petrochemical Industries, Ltd.; solid content: 40%; particle size: 5 μm) | 100 parts |
| Ionomer resin (Chemipearl SA-100; produced by Mitsui Petrochemical Industries, Ltd; solid content: 35%) | 10 parts |
| Polyoxyethylene (Emulgen A-500; produced by Kao Corporation) | 0.2 part |

EXAMPLE 4

Composition E and Composition F used in Example 3 were coated on a polytetrafluoroethylene film in the same manner as in Example 3, and thereafter the polytetrafluoroethylene film was peeled off to obtain a white opaque recording medium. On the recording medium, ink jet recording was applied in the same manner as in Example 1.

Evaluations of the recording medium were also made following the procedure in Example 1.

Results of the above are shown in Table 2.

COMPARATIVE EXAMPLE 1

Using commercially available ink jet paper (IJ matcoat paper NM; produced by Mitsubishi Paper Mills, Ltd.) as a recording medium, ink jet recording was carried out in the same manner as in Example 1. Evaluations of the recording medium were also made following the procedures in Example 1. Results are shown in Table 2.

COMPARATIVE EXAMPLE 2

Using ink jet paper used in Comparative Example 1 as a recording medium, ink jet recording was carried out in the same manner as in Example 1. Thereafter, using a laminator (MS Lamipet L-230; produced by Meiko Shokai Co., Ltd.), a laminating film (MS pouch film; 100 μm thick; produced by Meiko Shokai Co., Ltd.) was laminated on the image recording face. Evaluations of the resultant medium were made following the procedures in Example 1. Results are shown in Table 2.

COMPARATIVE EXAMPLE 3

Using commercially available glossy paper (SA Kinfuji Super Art; produced by Kanzaki Paper MFG. Co., Ltd.) as a recording medium, ink jet recording was carried out in the same manner as in Example 1. Evaluations of the recording medium were also made following the procedures in Example 1. Results are shown in Table 2.

COMPARATIVE EXAMPLE 4

Using a polyethylene terephthalate film (100 μm thick; produced by Toray Industries, Inc.) as a light-transmissive substrate, the substrate was coated with the following composition G by means of a bar coater so as to have a dry spread of 15 g/m$^2$, followed by drying in a drying stove at 100° C. for 5 minutes.

| Composition G: | |
|---|---|
| Colloidal silica (Snowtex 20L; produced by Nissan Chemical Industries, Ltd.; solid content: 20%) | 100 parts |
| Polyvinyl alcohol (PVA-117; produced by Kuraray Co., Ltd.; 10% aqueous solution) | 30 parts |

On the comparative recording medium thus obtained, recording was carried out in the same manner as in Example 1 to make evaluations of the recording medium. Results are shown in Table 2.

In Comparative Examples 1 to 3, the image surface gloss (%) and the water resistance (%) was determined by measuring the gloss and the density at the surface on which ink was applied.

TABLE 2

| | Ink absorbency | Optical density of images (A) | Optical density of images (B) | Image surface gloss (%) | Water resistance (%) | Operational facility | Overall evaluation |
|---|---|---|---|---|---|---|---|
| Example 1 | 1 sec. | 2.08 | 0.57 | 116.0 | 105 | o | o |
| Example 2 | 1 sec. | 1.90 | 0.45 | 121.0 | 102 | o | o |
| Example 3 | 1 sec. | 2.20 | 0.60 | 118.0 | 115 | o | o |
| Example 4 | 1 sec. | 1.90 | 0.50 | 95.0 | 110 | o | o |
| Comparative Example 1 | 1 sec. | 0.13 | 1.55 | 4.3 | 112 | o | X |
| Comparative Example 2 | 1 sec. | 0.20 | 1.75 | 118.0 | 100 | X | X |
| Comparative Example 3 | 10 min. | 0.15 | 1.42 | 30.1 | 28 | o | X |
| Comparative Example 4 | 1 sec. | 1.72 | 1.68 | 110.0 | 8 | o | X |

EXAMPLE 5

A polyethylene terephthalate film (100 μm thick; produced by Toray Industries, Inc.) used as a light-transmissive substrate was coated on its surface with the following Composition H by means of a bar coater so as to have a dried film thickness of 6 μm, followed by drying in a drying stove at 110° C. for 5 minutes.

| Composition H: | |
|---|---|
| Comb polymer* (25% Methyl cellosolve solution) | 55 parts |
| Monoalkyl esters of poly(methyl vinyl ether/maleic acid) (Gantrez ES-425; produced by GAF; 10% solution of water/ethanol) | 45 parts |

*A graft polymer of 80 parts of backbone chain (copolymer of 64 parts of 2-hydroxyethyl methacrylate and 16 parts of dimethyl acrylamide grafted with 20 parts of MMA macromer)

Subsequently, the above coating was further coated with the following Composition I by means of a bar coater so as to have a dried film thickness of 25 μm, followed by drying in a drying stove at 75° C. for 10 minutes.

| Composition I: | |
|---|---|
| Low density polyethylene resin (Chemipearl M-200; produced by Mitsui Petrochemical Industries, Ltd; solid content: 40%) | 100 parts |
| Ionomer resin (Chemipearl SA-100; produced by Mitsui Petrochemical Industries, Ltd; solid content: 35%) | 11 parts |
| Sodium dioctylsulfosuccinate (Pelex OT-P; produced by Kao Corporation; solid content: 70%) | 0.2 part |

The recroding medium thus obtained was white and opaque. On this recording medium, ink jet recording was carried out in the same manner as in Example 1.

In respect of the recorded matters thus obtained, a polyethylene terephthalate film (100 μm thick; produced by Toray Industries, Ltd.) was laminated on the ink transporting layer, and then fused by using a laminator (MS Lamipet L-230; produced by Meiko Shokai Co., Ltd.).

Recorded matters thus obtained were tested in the same manner as in Example 1 to see whether they can sufficiently answer the object of the present invention, by evaluating the ink absorbency, the optical density (A) of images and the image surface gloss. The adhesion between the substrate and the recording medium was also evaluated, and designated as "o" where the adhesion was good and as "X" where they were not adhered or readily peeled off.

Overall evaluations were made based on the results thus obtained. Results are shown in Table 2.

The overall evaluations were made by designating as "o" where the recording liquid was immediately absorbed, the suitability to ink jet recording was excellent, the image viewing surface had glossiness, the image viewing sheet was readily produced, the adhesion to the substrate was good, and sharp recorded images were obtained, and as "X" where any one of the ink jet suitability, the glossiness of image viewing surface, the optical density of images, the adhesion and the shapness of images was insufficinet.

EXAMPLE 6

A polyethylene terephthalate film used in Example 1 as a light-transmissive substrate was coated on its surface with the following Composition J by means of a bar coater so as to have a dried film thickness of 8 μm, followed by drying in a drying stove at 120° C. for 5 minutes.

| Composition J: | |
|---|---|
| Polyvinyl pyrrolidone (PVP K-90; produced by GAF; 10% solution) | 85 parts |
| Novolac phenol resin (Resitop PSK-2320; produced by Gun-ei Chemical Industry Co., Ltd.; 10% DMF solution) | 15 parts |

Subsequently, the above coating was further coated with the following Composition K by means of a bar coater so as to have a dried film thickness of 20 μm, followed by drying in a drying stove at 80° C. for 10 minutes.

| Composition K: | |
|---|---|
| Ethylene/vinyl acetate copolymer resin (Flowback Q16079N; produced by Seitetsu Kagaku Co., Ltd.) | 100 parts |
| Carboxymethylcellulose (Metollose 60SH; produced by Shin-etsu Chemical Co., Ltd.; 4% aqueous solution) | 25 parts |
| Polyoxyethylene octyl phenyl ether (Emulgen 810; produced by Kao Corporation) | 0.3 part |
| Water | 50 parts |

The recording medium thus obtained was white and opaque. On this recording medium, ink jet recording was carried out in the same manner as in Example 1.

Thereafter, art paper (SA Kinfuji Super Art; produced by Kanzaki Paper MFG. Co., Ltd.; basis weight: 157 $g/m^2$) was superposed on the ink transporting layer, and then contact bonded thereto by using an iron (surface temperature: 130° C.) from the art paper side.

Evaluations of the resultant recording medium were also made following the procedures in Example 5. Results are shown in Table 3.

EXAMPLE 7

A polyethylene terephthalate film used in Example 1 as a light-transmissive substrate was coated on its surface with the following Composition L by means of a bar coater so as to have a dried film thickness of 10 μm, followed by drying in a drying stove at 100° C. for 12 minutes.

| Composition L: | |
|---|---|
| Polyvinyl pyrrolidone (PVP K-90; produced by GAF; 10% DMF solution) | 80 parts |
| Styrene/acrylic acid copolymer (Oxylac SH-2100; produced by Nippon Shokubai Kagaku Kogyo, Co., Ltd.; 10% DMF solution) | 15 parts |

Subsequently, the above coating was further coated with the following Composition M by means of a bar coater so as to have a dried film thickness of 20 μm, followed by drying in a drying stove at 70° C. for 10 minutes.

| Composition M: | |
|---|---|
| Polyamide resin (Toin Thermotac SK-1; produced by Tokyo Ink Co., Ltd.; particle size: 20 μm) | 100 parts |
| Styrene/butadiene rubber (ISR 6619; produced by Nippon Synthetic Rubber Co., Ltd.; solid content: 50% | 15 parts |
| Polyoxyethylene (Emulgen A-500; produced by Kao Corporation) | 0.2 part |

-continued

| Composition M: | |
|---|---|
| Water | 40 parts |

The recording medium thus obtained was white and opaque. On this recording medium, ink jet recording was carried out in the same manner as in Example 1.

Thereafter, a glass plate (2 mm thick) was superposed on the ink transporting layer, and then contact bonded thereto by using an iron (surface temperature: 140° C.) from the substrate side.

Evaluations of the resultant recording medium were also made following the procedures in Example 5. Results are shown in Table 3.

EXAMPLE 8

Composition L and Composition M used in Example 7 were coated on a tetrafluoroethylene film in the same manner as in Example 7, and thereafter the tetrafluoroethylene film was peeled off to obtain a white opaque recording medium. On the recording medium, ink jet recording was applied in the same manner as in Example 1.

Thereafter, an aluminum foil was superposed on the ink transporting layer, and then contact bonded thereto by using an iron (surface temperature: 120° C.) from the aluminum foil side.

Evaluations of the recording medium were also made following the procedure in Example 5.

Results of the above are shown in Table 3.

COMPARATIVE EXAMPLE 5

On the recording medium obtained in Comparative Example 4, recording was carried out in the same manner as in Example 1. On the recorded matters obtained, art paper was superposed in the same manner as in Example 6, and then contact bonded thereto.

Evaluations on the resultant recording medium were made following the procedures in Example 5. Results are shown in Table 3.

TABLE 3

| | Ink absorbency (sec.) | Optical density of images | Image surface gloss (%) | Adhesion | Overall evaluation |
|---|---|---|---|---|---|
| Example 5 | 2 | 1.90 | 121.0 | o | o |
| 6 | 2 | 2.20 | 118.0 | o | o |
| 7 | 3 | 2.08 | 116.0 | o | o |
| 8 | 2 | 2.10 | 105.0 | o | o |
| Comparative Example 5 | 1 | 1.72 | 116.0 | X | X |

EXAMPLE 9

A polyethylene terephthalate film (100 μm thick; produced by Toray Industries, Inc.) used as a light-transmissive substrate was coated on its surface with the following Composition N by means of a bar coater so as to have a dried film thickness of 10 μm, followed by drying in a drying stove at 140° C. for 10 minutes.

| Composition N: | |
|---|---|
| Cationic modified polyvinyl alcohol (PVA-C-318-2A; produced by Kuraray Co., Ltd; 10% aqueous solution) | 100 parts |
| Isocyanate compound (Elastron C-9; produced by Daiichi Kogyo Sieyaku Co., Ltd.; 10% aqueous solution) | 7 parts |
| Water-soluble melamine resin (Sumimarl M-50W; produced by Sumitomo Chemical Co., Ltd.; 10% aqueous solution | 40 parts |

Subsequently, the above coating was further coated with the following Composition O by means of a bar coater so as to have a dried film thickness of 20 μm, followed by drying in a drying stove at 100° C. for 5 minutes.

| Composition O: | |
|---|---|
| Polystyrene resin dispersion (L-8801; mean particle size: 0.5 μm; solid content: 45%; produced by Asahi Chemical Industry Co., Ltd.) | 100 parts |
| Polyvinyl alcohol (PVA-117; 10% aqueous solution; produced by Kuraray Co., Ltd.) | 45 parts |
| Surfactant (Emulgen 810; produced by Kao Corporation | 0.2 part |

On the recording medium, ink jet recording was carried out in the same manner as in Example 1, but by using the following four kinds of ink.

| | |
|---|---|
| Yellow ink (makeup): | |
| C.I. Direct Yellow 23 | 2 parts |
| Diethylene glycol | 15 parts |
| Water | 85 parts |
| Red ink (makeup): | |
| C.I. Acid Red 92 | 2 parts |
| Diethylene glycol | 15 parts |
| Water | 85 parts |
| Blue ink (makeup): | |
| C.I. Direct Blue 86 | 2 parts |
| Diethylene glycol | 15 parts |
| Water | 85 parts |
| Black ink (makeup): | |
| C.I. Direct Black 19 | 2 parts |
| Diethylene glycol | 15 parts |
| Water | 85 parts |

The recording medium thus obtained was evaluated in the same manner as in Example 1. Results are shown in Table 4.

EXAMPLE 10

A polyester film used in Example 9 as a transparent substrate was coated with cationic modified polyvinyl alcohol (PVA-C-318AA; 10% aqueous solution; produced by Kuraray Co., Ltd.) by means of a bar coater so as to have a dried film thickness of 5 μm, followed by drying at 100° C. for 10 minutes to form an ink retaining layer. Subsequently, the above coating was coated with a coating liquid having the following makeup by means of a bar coater so as to have a dried film thickness of 45 μm, followed by drying under the conditions of 140° C. for 5 minutes to form an ink transporting layer, whereupon a white opaque recording medium was obtained.

| Coating liquid makeup: | |
|---|---|
| Polymethacrylate resin (Microsphere M-100; mean particle size: 8 to 10 μm; produced by Matsumoto Yushi-Seiyaku Co., Ltd.) | 100 parts |
| Polyvinyl alcohol (PVA-117; 10% aqueous solution: produced by Kuraray Co., Ltd.) | 100 parts |
| Surfactant (Emulgen A-500; produced by | 0.2 part |

-continued

| Coating liquid makeup: | |
|---|---|
| Kao Corporation) | |
| Water | 40 parts |

Using the recording medium thus obtained, recording was carried out in the same manner as in Example 9 to make evaluations. Results are shown in Table 4.

EXAMPLE 11

A polyester film used in Example 9 as a transparent substrate was coated with polyurethane ionomer (HYDRAN AP; produced by Dainippon Ink & Chemicals, Incorporated) by means of a bar coater so as to have a dried film thickness of 3 μm, followed by drying at 100° C. for 10 minutes to form an ink retaining layer. Subsequently, the above coating was coated with a coating liquid having the following makeup by means of a bar coater so as to have a dried film thickness of 30 μm, followed by drying under the conditions of 80° C. for 10 minutes to form an ink transporting layer, whereupon a white opaque recording medium was obtained.

| Coating liquid makeup: | |
|---|---|
| Low density polyethylene resin dispersion (Chemipearl M-200; solids content: 40%, mean particle size: 5 μm; produced by Mitsui Petrochemical Industries, Ltd.) | 100 parts |
| Ethylene/vinyl acetate copolymer solution (Chemipearl V-100; solid content: 40%; produced by Mitsui Petrochemical Industries, Ltd.) | 10 parts |
| Surfactant (pelex OT-P; active component: 70%; produced by Kao Corporation) | 0.2 part |

Using the recording medium thus obtained, recording was carried out in the same manner as in Example 9 to make evaluations. Results are shown in Table 4.

COMPARATIVE EXAMPLE 6

Commercially available OHP film (trade name: FP-AL10 Transparency; produced by Canon K.K.) was used to prepare a comparativ recording medium.

Using this recording medium, recording was carried out in the same manner as in Example 9 to make evaluations. Results are shown in Table 4.

COMPARATIVE EXAMPLE 7

Commercially available tracing paper (trade name: Tracing (mat); 40 g/m²; produced by Mitsubishi Paper Mills, Ltd.) was used to prepare a comparative recording medium.

Using this recording medium, recording was carried out in the same manner as in Example 9 to make evaluations. Results are shown in Table 4.

COMPARATIVE EXAMPLE 8

Commercially available roll paper (trade name: Pure White Roll (HAMAYUU); 30 g/m²; produced by Kishu Paper Co., Ltd.) was used to prepare a comparative recording medium.

Using this recording medium, recording was carried out in the same manner as in Example 9 to make evaluations. Results are shown in Table 4.

COMPARATIVE EXAMPLE 9

Commercially available high quality paper (trade name: GINWA; 64 g/m²; produced by Sanyo-Kokusaku Pulp Co., Ltd.) was used to prepare a comparative recording medium.

Using this recording medium, recording was carried out in the same manner as in Example 9 to make evaluations. Results are shown in Table 4.

TABLE 4

| | Example | | |
|---|---|---|---|
| (Evaluation items) | 9 | 10 | 11 |
| Ink fixing time | 2 sec. | 3 sec. | 1 sec. |
| Image density | | | |
| Ink applying face (B) | 0.60 | 0.72 | 0.57 |
| Reverse face (A) | 1.70 | 1.80 | 2.20 |
| Glossiness | 120.0% | 110.0% | 118.0% |
| Overall evaluation | o | o | o |

| | Comparative Example | | | |
|---|---|---|---|---|
| (Evaluation items) | 6 | 7 | 8 | 9 |
| Ink fixing time | 5 min. | 2 days | 1 sec. | 1 sec. |
| Image density | | | | |
| Ink applying face (B) | 1.20 | 1.30 | 1.26 | 0.95 |
| Reverse face (A) | 1.03 | 0.90 | — | — |
| Glossiness | 61.0% | 3.4% | 16.3% | 5.7% |
| Overall evaluation | X | X | X | X |

We claim:

1. A recording medium comprising a light-transmissive ink retaining layer and a light-diffusive ink transporting layer respectively provided on a light-transmissive substrate.

2. A recording medium, comprising a light-transmissive ink retaining layer and a heat or pressure fusible and light-diffusive ink transporting layer respectively provided on a light-transmissive substrate.

3. The recording medium according to claim 1 or 2, wherein said ink transporting layer is porous.

4. The recording medium according to claim 1 or 2, wherein said ink retaining layer is non-porous.

5. The recording medium according to claim 1 or 2, wherein said ink retaining layer comprises a cationic resin or hydrophilic polymer.

6. The recording medium according to claim 1 or 2, wherein said ink retaining layer has higher absorbing power than said ink transporting layer.

7. The recording medium according to claim 1 or 2, wherein said ink transporting layer has communicated holes.

8. The recording medium according to claim 1 or 2, wherein said ink transporting layer has fissures therein.

9. The recording medium according to claim 1 or 2, wherein said ink transporting layer has a thickness ranging between 1 μm and 300 μm.

10. The recording medium according to claim 1 or 2, wherein said ink transporting layer has a thickness ranging between 5 μm and 200 μm.

11. The recording medium according to claim 1 or 2, wherein said ink transporting layer has a thickness ranging between 10 μm and 150 μm.

12. The recording medium according to claim 1 or 2, wherein said ink retaining layer has a thickness ranging between 1 μm and 70 μm.

13. The recording medium according to claim 1 or 2, wherein said ink retaining layer has a thickness ranging between 2 μm and 50 μm.

14. The recording medium according to claim 1 or 2, wherein said ink retaining layer has a thickness ranging between 3 μm and 20 μm.

15. A recording medium according to claim 1, wherein said ink retaining layer has higher dyeability to a dye than the ink transporting layer.

16. A recording medium, comprising a light-transmissive ink retaining layer and a light-diffusive ink transporting layer respectively provided on a light-transmissive substrate, said ink transporting layer containing non-dyeable particles and a binder.

17. The recording medium according to claim 16, wherein the weight ratio of said particles to said binder constituting the ink transporting layer ranges between ⅓ and 70/1.

18. The recording medium according to claim 16, wherein the weight ratio of said particles to said binder constituting the ink transporting layer ranges between 1/1 and 50/1.

19. The recording medium according to claim 16, wherein the weight ratio of said particles to said binder constituting the ink transporting layer ranges between 3/1 and 20/1.

20. The recording medium according to claim 16, wherein said ink transporting layer is porous.

21. The recording medium according to claim 16, wherein said ink retaining layer is non-porous.

22. The recording medium according to claim 16, wherein said ink retaining layer comprises a cationic resin or a hydrophilic polymer.

23. The recording medium according to claim 16, wherein said ink retaining layer has higher absorbing power than said ink transporting layer.

24. The recording medium according to claim 16, wherein said ink transporting layer has a thickness ranging between 1 μm and 300 μm.

25. The recording medium according to claim 16, wherein said ink transporting layer has a thickness ranging between 5 μm and 200 μm.

26. The recording medium according to claim 16, wherein said ink transporting layer has a thickness ranging between 10 μm and 150 μm.

27. The recording medium according to claim 16, wherein said ink retaining layer has a thickness ranging between 1 μm and 70 μm.

28. The recording medium according to claim 16, wherein said ink retaining layer has a thickness ranging between 2 μm and 50 μm.

29. The recording medium according to claim 16, wherein said ink retaining layer has a thickness ranging between 3 μm and 20 μm.

30. A process for forming an image by applying droplets of an aqueous ink containing a water-soluble dye on a recording medium, said recording medium comprising a light-transmissive ink retaining layer and a light-diffusive ink transporting layer respectively provided on a light-transmissive substrate.

31. The process for forming an image according to claim 30, wherein said recording liquid contains a dye at a concentration of 0.1 to 20 percent by weight.

32. The process for forming an image according to claim 30, wherein the image is formed using yellow, magenta, cyan and black ink.

33. A process for forming an image, comprising applying ink onto a recording medium having a light-diffusive ink transporting layer and a light-transmissive ink retaining layer from the side of the ink transporting layer to form an image, the optical density (A) of the image as measured from the side of the ink retaining layer being higher than the optical density (B) of the image as measured from the side of the ink-transporting layer.

34. The process according to claim 33, wherein said recording medium comprises the ink retaining layer and the ink transporting layer which are provided on a substrate.

35. The process according to claim 33, wherein the ratio of optical density (A)/optical density (B) is 1.2 or more.

36. The process according to claim 33, wherein the ratio of optical density (A)/optical density (B) is 1.5 or more.

37. The process according to claim 33, wherein the ratio of optical density (A)/optical density (B) is 2.0 or more.

38. A process for forming images on a recording medium comprising a heat- or pressure-fusible and light-diffusive ink transporting layer and a light-transmissive ink retaining layer respectively provided on a light-transmissive substrate, which comprises applying recording droplets to said ink transporting layer of the recording medium, and thereafter fusing said ink transporting layer to said substrate.

* * * * *

UNITED STATES PATENT AND TRADEMARK OFFICE
CERTIFICATE OF CORRECTION

PATENT NO. : 4,785,313

DATED : November 15, 1988

INVENTOR(S) : MASAHIKO HIGUMA, ET AL.

It is certified that error appears in the above-identified patent and that said Letters Patent is hereby corrected as shown below:

COLUMN 20

Line 31, "heat or pressure fusible" should read --heat- or pressure- fusible--.

Line 43, "has higher" should read --has a higher--.

COLUMN 21

Line 29, "has higher" should read --has a higher--.

COLUMN 22

Line 45, "said substrate." should read --a second substrate.--.

Signed and Sealed this

Sixteenth Day of May, 1989

*Attest:*

DONALD J. QUIGG

*Attesting Officer*

*Commissioner of Patents and Trademarks*